(12) United States Patent
Weaver

(10) Patent No.: US 6,460,745 B1
(45) Date of Patent: Oct. 8, 2002

(54) BICYCLE RACK MOUNTED TO A VEHICLE TRAILER HITCH SLEEVE

(76) Inventor: Eric R. Weaver, 2008 E. Patterson St., Tampa, FL (US) 33610

( * ) Notice: Subject to any disclaimer, the term of this patent is extended or adjusted under 35 U.S.C. 154(b) by 0 days.

(21) Appl. No.: 09/832,279

(22) Filed: Apr. 10, 2001

(51) Int. Cl.[7] .................................................. B60R 9/00
(52) U.S. Cl. ........................... 224/519; 211/17; 211/18; 224/521; 224/525; 224/531; 224/533; 224/315
(58) Field of Search ................................. 224/521, 519, 224/523, 525, 524, 531, 533, 315, 924; 211/17, 18

(56) References Cited

U.S. PATENT DOCUMENTS

| | | |
|---|---|---|
| 5,190,195 A | 3/1993 | Fullhart et al. |
| 5,497,927 A | 3/1996 | Peterson |
| 5,526,971 A | 6/1996 | Despain |
| 5,862,966 A | 1/1999 | Mehls |
| 5,871,131 A | 2/1999 | Low et al. |
| 6,062,451 A | 3/2000 | Lassanske et al. |

*Primary Examiner*—Lee Young
*Assistant Examiner*—Maerena W. Brevard
(74) *Attorney, Agent, or Firm*—Larson & Larson, P.A.; James E. Larson

(57) ABSTRACT

A proximal end portion of a longitudinal base member is affixed to a vehicle trailer hitch sleeve. A distal end portion of the longitudinal base member is connected to an upright support member via a pair of brackets. The brackets pivot rearward to provide access to a vehicle trunk. The bicycle handlebars are mounted in an L-shaped tray integral with a rear edge of the pair of brackets. A padding covers a top portion of the upright support member. The padded upright member has a row of transverse bores. A U-shaped bolt adheres the frame of the bicycle to the padded upright member as the legs of the U-shaped bolt are passed through the bores and locked in place. A lock pin retains the upright member in a fixed position when it is pushed forward.

16 Claims, 6 Drawing Sheets

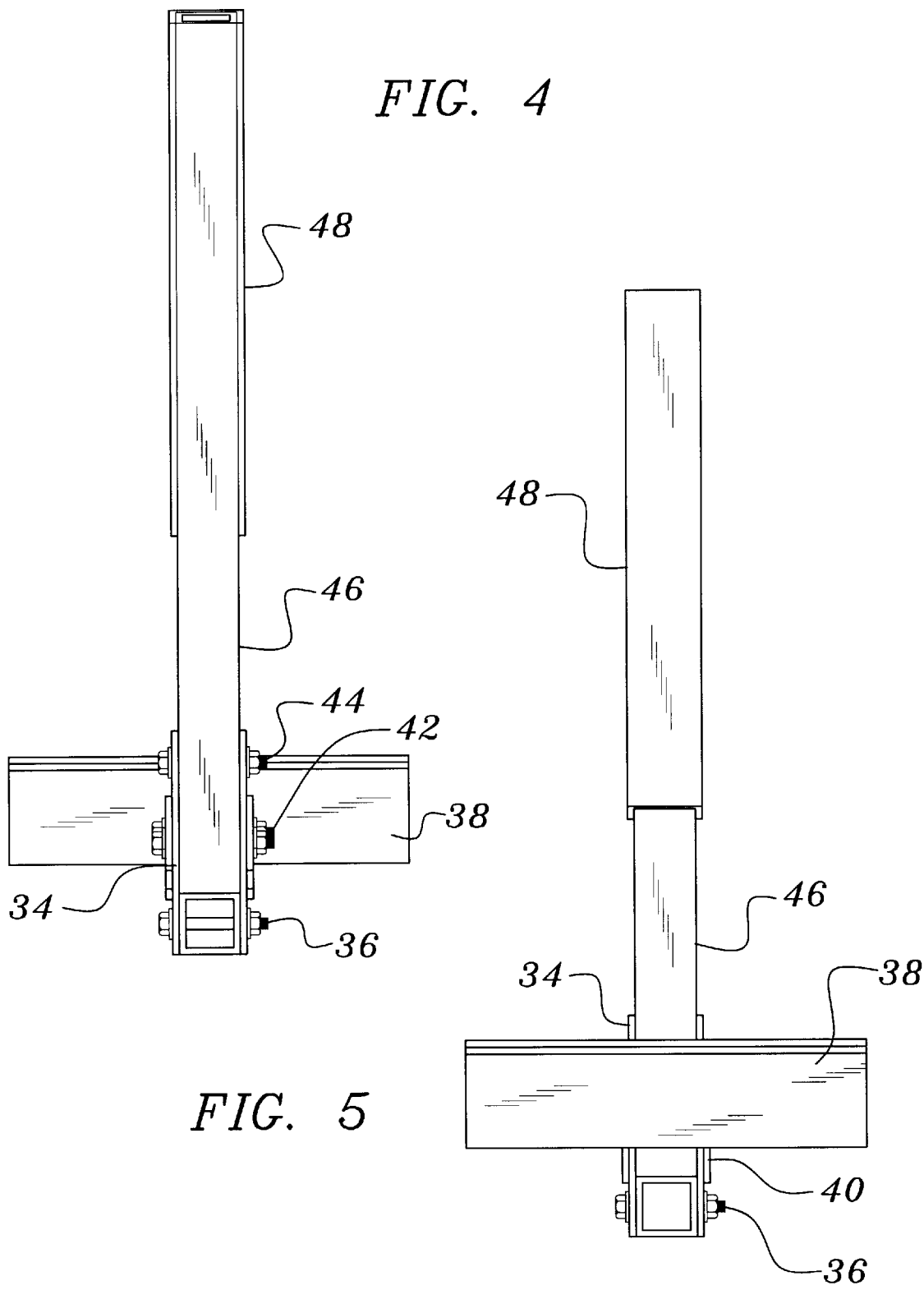

BICYCLE RACK MOUNTED TO A VEHICLE TRAILER HITCH SLEEVE

BACKGROUND OF THE INVENTION

1. Field of the Invention

This invention relates to racks for carrying bicycles on a motor vehicle. More particularly, it relates to bicycles mounted on a rack attached to a vehicle trailer hitch sleeve.

2. Description of the Prior Art

Transportation of bicycles on a vehicle is common and many bicycle racks are on the market to carry such bicycles. Many prior art references describe attachments of a bicycle rack to a trailer hitch attached to a vehicle. Examples of such patents include U.S. Pat. Nos. 5,497,927; 5,526,971; 5,862,966; 5,871,133; 6,000,594; 6,062,451; and 6,089,430. In each of these prior art patents bicycles are mounted generally perpendicular to the longitudinal axis of the vehicle. As a result, the bicycle has to be lifted into position and the bicycle blocks the rear view window of the vehicle. A bicycle rack is needed which will still be attached to the trailer hitch of a vehicle but be positioned in such a way that it minimizes the blocked view to the rear of the vehicle and also provides easy access to the vehicle's trunk.

SUMMARY OF THE INVENTION

The present bicycle rack invention is easy to mount and facilitates ease of attaching a bicycle or pair of bicycles upwardly and parallel to the longitudinal axis of a vehicle. A proximal portion of a longitudinally extending base member tongue is inserted into a vehicle's trailer hitch sleeve and locked in place using a locking device. A right angled padded handlebar support member is attached to a rear surface of a pivot bracket attached to a distal portion of the tongue. A padded upright member is bolted to the pivot bracket so that the upright member extends upwardly from the longitudinally extending base member. A bicycle's handlebars are placed down on the padded handlebar support member and a front frame of the bicycle is mounted upwardly and bolted with a U-shaped bolt to the padded upright member. Optionally, a cover can be placed down over the bicycle to protect it from the elements.

BRIEF DESCRIPTION OF THE DRAWINGS

The invention can be best understood by those having ordinary skill in the art by reference to the following detailed description when considered in conjunction with the accompanying drawings in which:

FIG. 4 is a front elevational view of the rack.

FIG. 5 is a rear elevational view of the rack.

BEST MODE OF THE INVENTION

Throughout the following detailed description, the same reference numbers refer to the same element in all figures.

Figure 1:
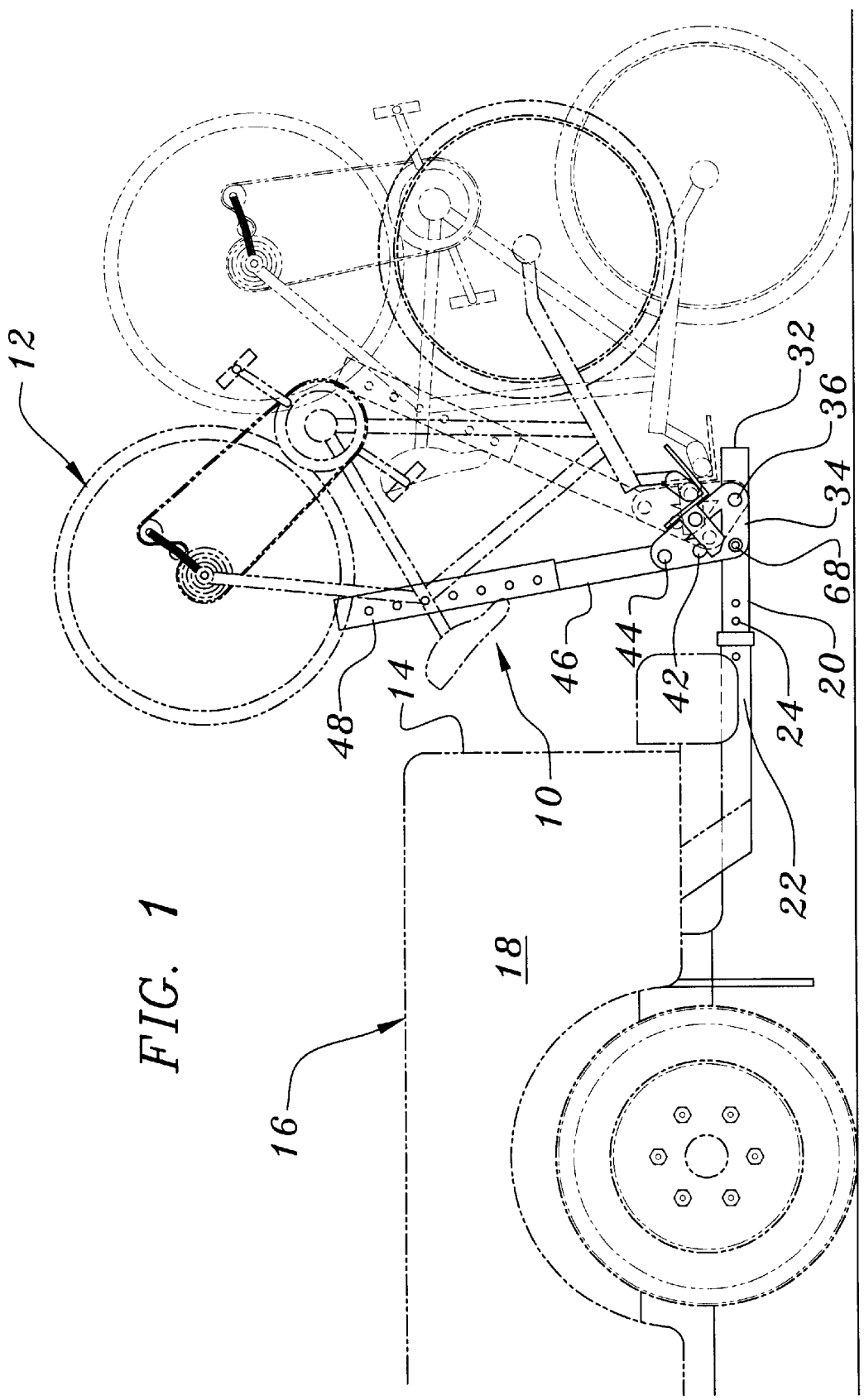
FIG. 1 is a side elevational view of the rack of this invention retaining a bicycle with the bicycle in phantom showing the retraction of the rack upright member for trunk access.
Figure 8:
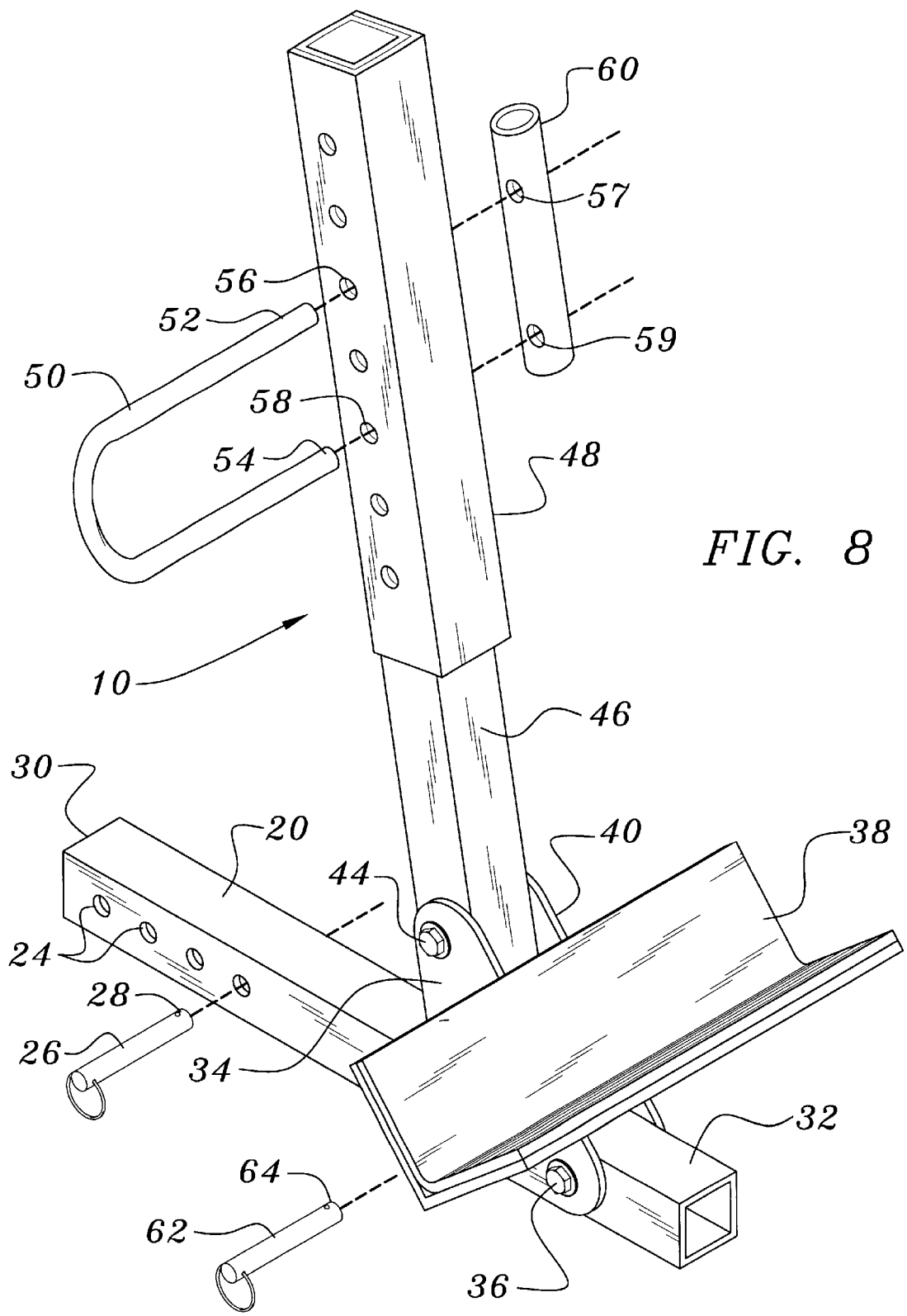
FIG. 8 is a perspective view of the rack attached to a trailer hitch sleeve.

Referring to FIGS. 1 and 8, the bicycle rack 10 of this invention supports a bicycle 12 in an upward vertical position at the rear end 14 of a vehicle 16. The bicycle 10 is thus mounted in a plane parallel to the longitudinal sides 18 of the vehicle. A tongue 20 is slid within a trailer hitch sleeve 22 permanently mounted to a bottom portion of the vehicle 16. Multiple transverse bores 24 in tongue 20 are aligned with bores in the trailer hitch sleeve 22 and a locking device 26 is used to lock the tongue 20 to the trailer hitch sleeve 22.

Figure 2:
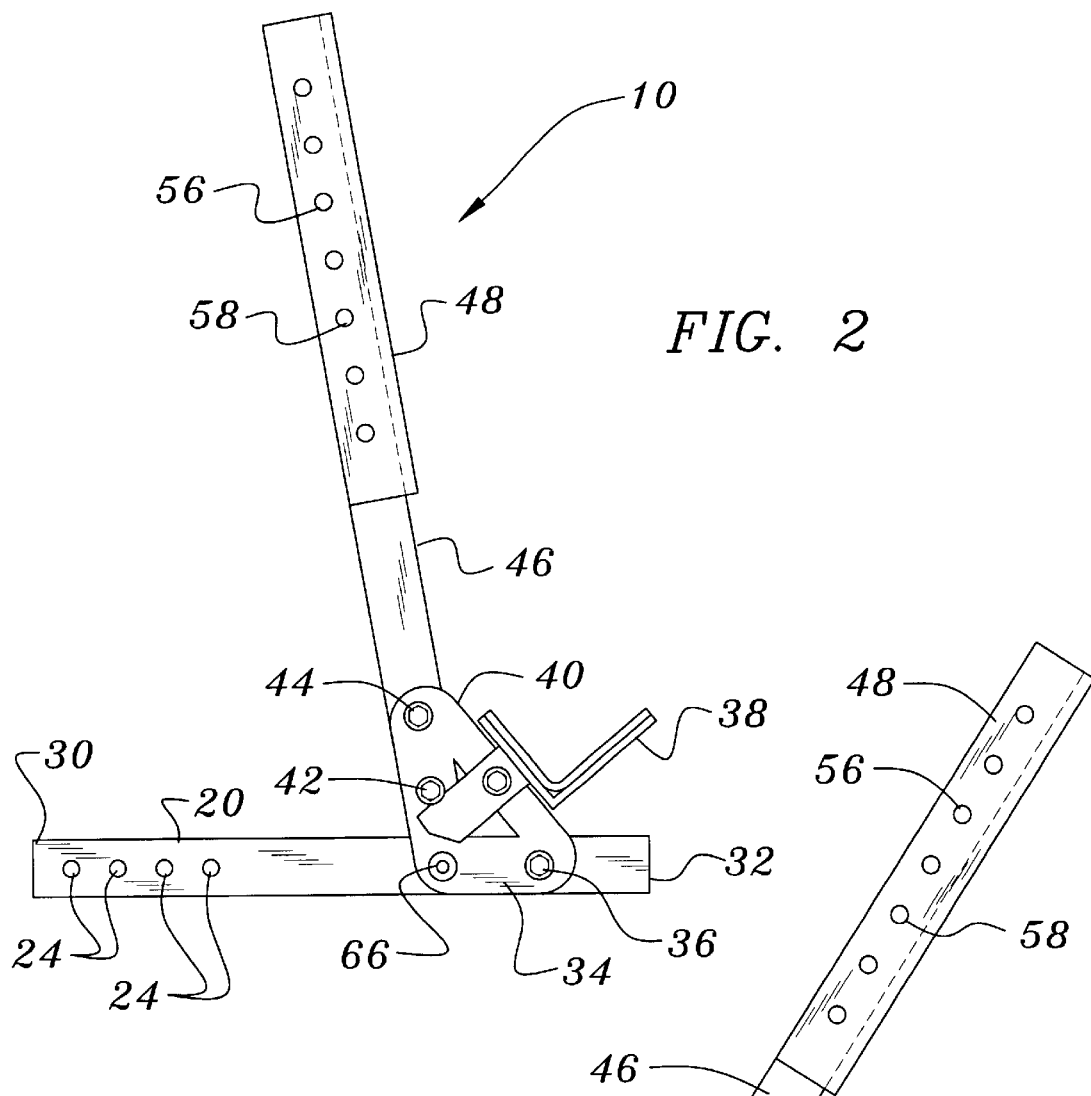
FIG. 2 is a left side elevational view of the rack attached to a trailer hitch sleeve in the underway position.
Figure 3:
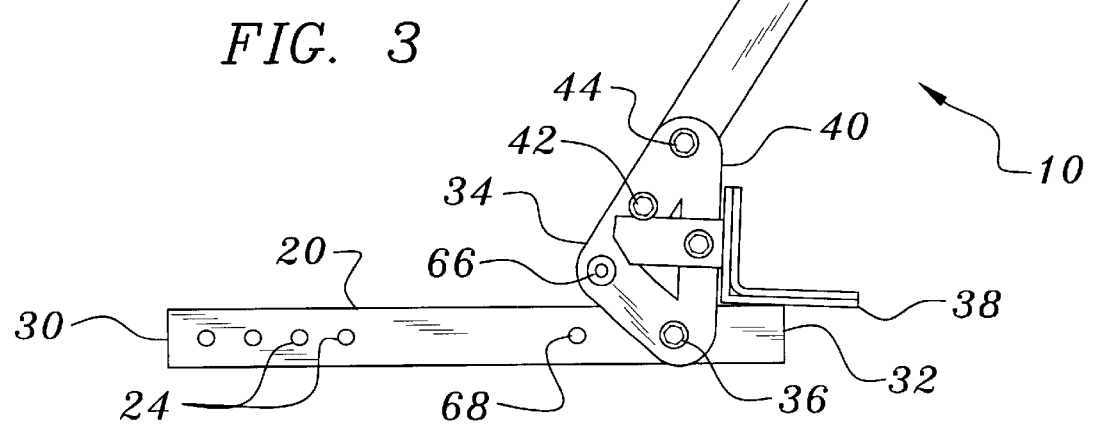
FIG. 3 is a left side elevational view of the rack according to FIG. 2 in the trunk access position.
Figure 6:
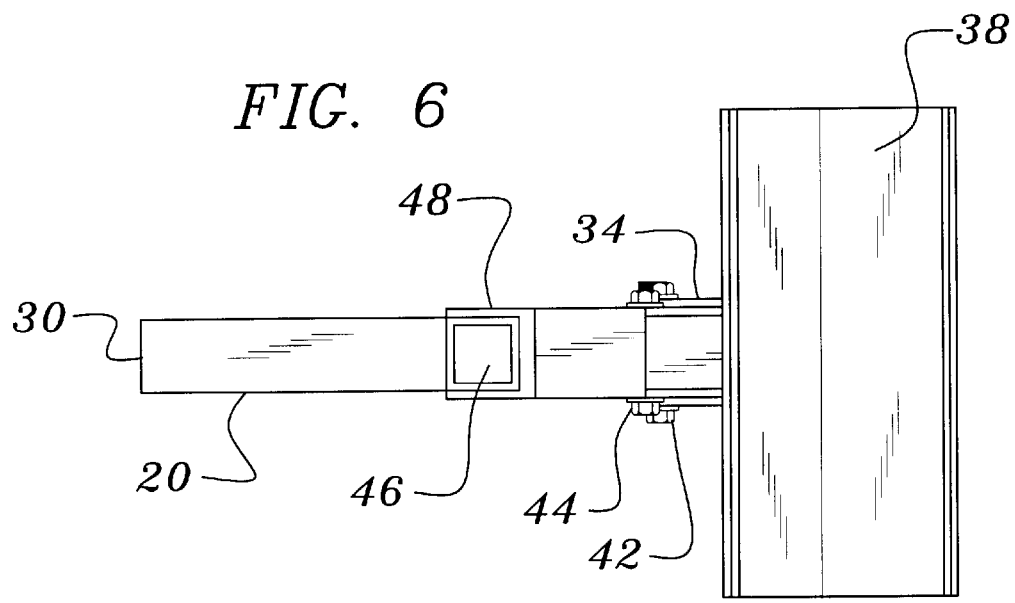
FIG. 6 is a top plan view of the rack attached to a trailer hitch sleeve.
Figure 7:
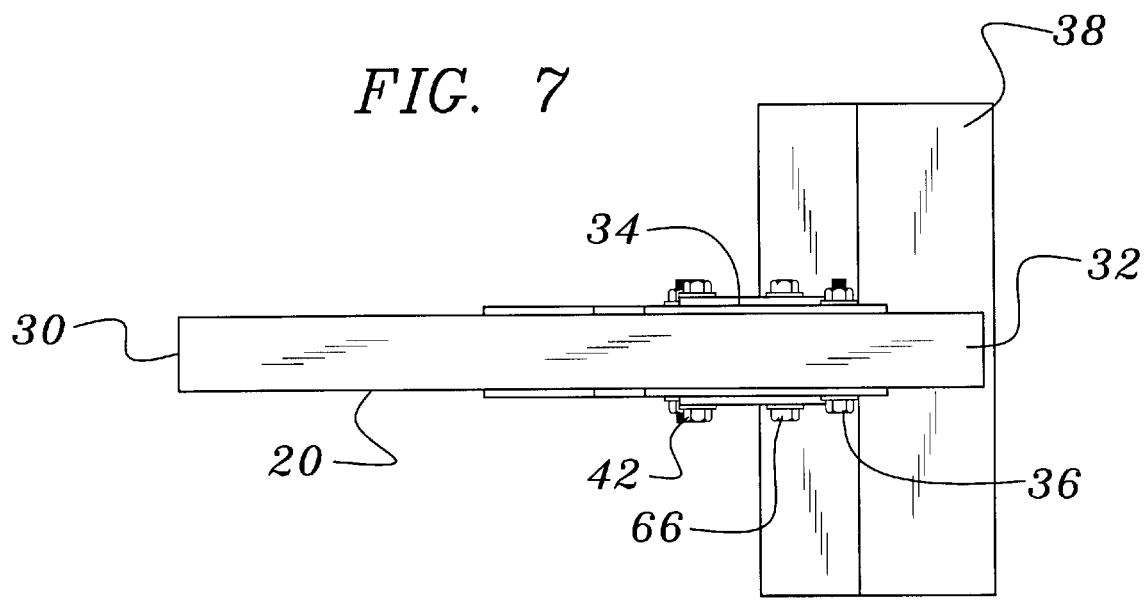
FIG. 7 is a bottom plan view of the rack attached to a trailer hitch sleeve.

As seen in FIGS. 2–3, the proximal end 30 of the tongue 20 is inserted within the trailer hitch sleeve 22 whereas the distal end 32 has a pair of triangular brackets 34 bolted at pivot point 36 to the tongue 20. A padded handlebar right angled support member 38 is integral by welding to a back side 40 of brackets 34 or bolting with side flanges to the bracket 34. Bolts 42 and 44 attach the pair of brackets 34 to a lower end portion of an upright member 46. A top portion of upright member 46 is enclosed by a padding 48. The padding 48 can be a cloth material or a soft elastomer.

Referring to FIGS. 1–3 and 8, a bicycle 12 is loaded on handle bar support member 38 by inverting the bike and placing the bicycle handlebars on support member 38 as seen in FIGS. 2 and 8. A frame member of the bicycle 12 is engaged with a U-bolt 50 and the leg 52 of bolt 50 is threaded through bore 56 or 58 and aligned with bore 57 in locking tube 60 to lock the bicycle to rack 10. Leg 54 passes outside of padding 48 and into bore 59 of locking tube 60. A lock pin 62 having a nipple release 64 is placed in bore 66 and aligned with bore 68 on the tongue to lock the upright member 46 in the position shown in FIG. 2. If trunk access is needed, the lock pin 62 is removed from hole 68 and upright member 46 is pivoted backward as shown in FIG. 3. Upright member 46 is pivoted forward at pivot point 36 to the position shown in FIG. 3 for opening the trunk.

Figure 9:
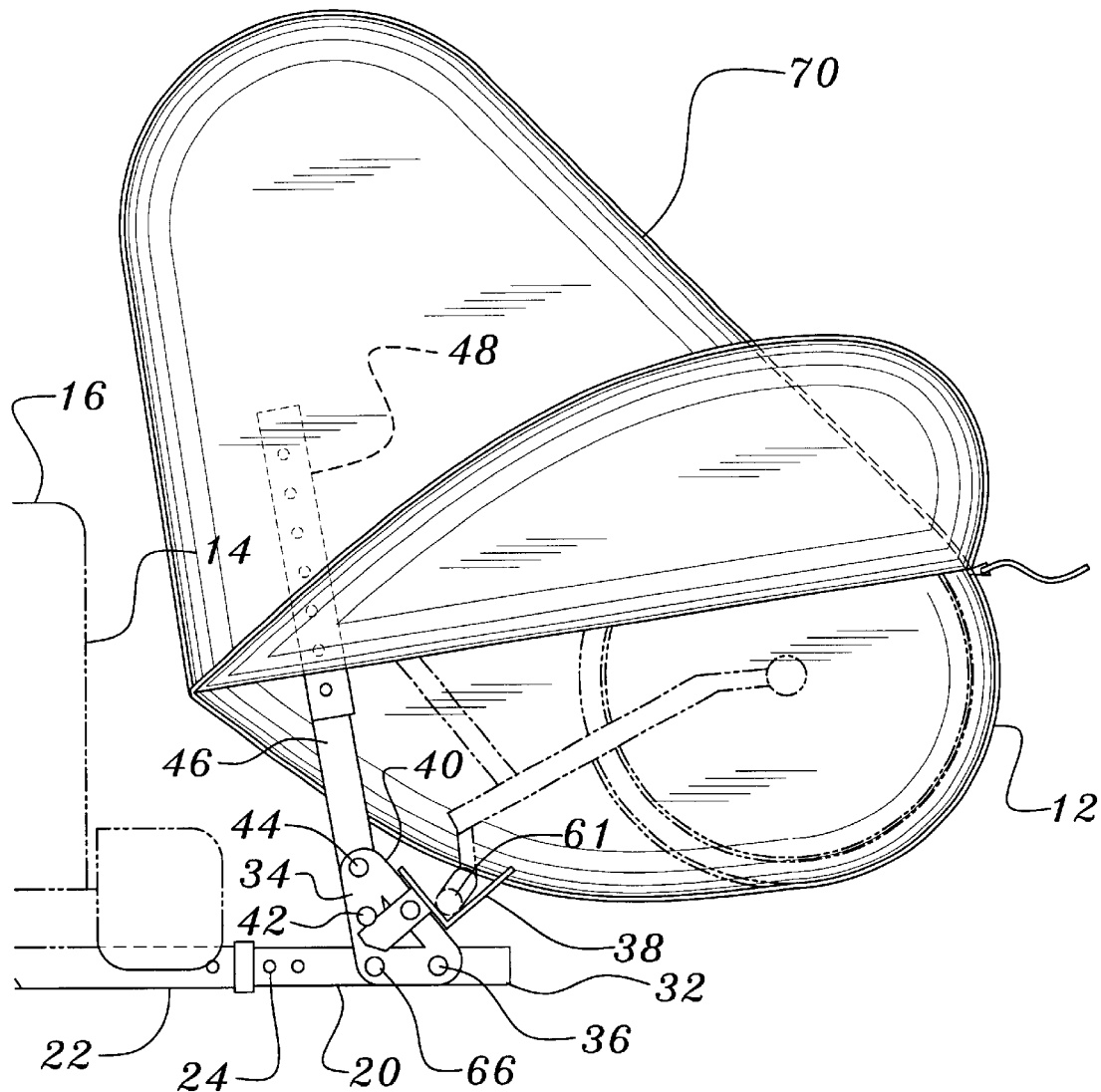
FIG. 9 is a perspective view of the rack with a bicycle mounted thereon with a tarp cover.

Optionally, a tarp cover 70 is placed over the bicycle to protect the bicycle from the elements as shown in FIG. 9.

The bicycle 20 is easily removed from rack 10 by first removing the tarp cover 70. The lock tube 60 is removed and the U-bolt 50 is removed to release the bicycle frame from the rack 10. The rack 10 is easily removed from the vehicle 16 trailer hitch sleeve 22 by removing locking device 26.

Using the rack 10 of this invention, a bicycle can be quickly loaded or removed from the rack 10 without bicycle disassembly or denting of the vehicle 16. In addition, the mounting of the bicycle parallel to the sides 18 of the vehicle 16 causes minimum obstruction to the view through the vehicle 16 rear window.

Although the invention has been described according to its best mode, equivalent elements can be substituted for the elements described herein.

Having thus described the invention what is claimed and desired to be secured by Letters Patent is:

1. A bicycle rack supporting a bicycle, the rack engaged to a vehicle trailer hitch sleeve, the rack comprising:
   a longitudinal base member having a proximal end portion engaged to the vehicle trailer hitch sleeve and a distal end portion supporting an upright member pivotably connected to the base member by a bracket, a rear portion of the bracket integral with a forward wall of a handle bar support member;

the bicycle handlebars supported in the handlebar support member so that a frame of the bicycle extends upwardly;

a padded member mounted over a top portion of the upright member, the padded top portion of the upright member having a row of through bores, the bicycle frame juxtaposed to the padded top portion of the upright member and means for securing the bicycle frame to the padded top portion of the upright member so that the bicycle is secured in an upright position with respect to the longitudinal base member.

2. The bicycle rack supporting a bicycle according to claim 1 wherein the bracket is a pair of triangle shaped brackets.

3. The bicycle rack supporting a bicycle according to claim 2, wherein one corner portion of the pair of triangle shaped brackets pivots along a side of the longitudinal base member so that the upright member can move rearwardly when access to a vehicle trunk is required.

4. The bicycle rack supporting a bicycle according to claim 3 wherein a second corner portion of the pair of triangle shaped brackets has a bore aligned with a transverse bore in the longitudinal base member and a lock pin positioned within the bores of the triangle shaped brackets and the longitudinal base member lock the upright member in a most forward position.

5. The bicycle rack supporting a bicycle according to claim 1 wherein the proximal end portion of the longitudinal base member has a row of transverse bores aligning to a bore in the vehicle trailer hitch sleeve and a locking device is positioned within the bores of the longitudinal base member so the vehicle trailer hitch sleeve and the longitudinal base member are locked together.

6. The bicycle rack supporting a bicycle according to claim 2 wherein the rear side edge of the brackets is welded to a rear wall of the handle bar support member.

7. The bicycle rack supporting a bicycle according to claim 2 wherein flanges attached to the rear wall of the handlebar support member are bolted to the pair of triangle shaped brackets.

8. The bicycle rack supporting a bicycle according to claim 1 wherein the handlebar support member is an L-shaped longitudinal receptacle.

9. The bicycle rack supporting a bicycle according to claim 1 wherein the means for securing the bicycle frame to the upright member is a U-bolt enclosing the bicycle frame and having legs of the U-bolt passing through the aligned bores in the upright padded member together with a locking member at an end of at least one leg preventing the U-bolt from disengagement from the aligned bores.

10. A bicycle rack supporting a bicycle, the rack engaged to a vehicle trailer hitch sleeve, the rack comprising:

a tongue having a proximal portion and a distal portion with respect to the trailer hitch sleeve, the proximal portion of the tongue slidably engaged within the trailer hitch sleeve and fixedly attached to the hitch sleeve by a device passing transversely through bores in the hitch sleeve and tongue, the distal portion of the tongue connected to a pair of brackets, the brackets pivoting at one corner on a side surface of the tongue, an upright member connected to the pair of brackets and a handlebar support member integral with a rear edge of the pair of brackets, the upright member and handlebar support member pivoting rearwardly with the pair of brackets when a transverse bolt through the side of the tongue and the pair of brackets is removed;

a padded upper portion of the upright member and a means for securing the frame of the bicycle adjacent the upright padded member.

11. The bicycle rack supporting a bicycle according to claim 10 wherein a row of bores in the upright padded member align with the means for securing the bicycle frame, the means being a U-bolt passing around the bicycle frame, and legs of the U-bolt passing through the aligned bores in the upright padded member, the legs of the U-bolt prevented from removal by a locking tube.

12. The bicycle rack supporting a bicycle according to claim 10 wherein the padding on the upright member is a soft elastomer.

13. The bicycle rack supporting a bicycle according to claim 10 wherein the padding on the upright member is a cloth material.

14. A method of mounting a bicycle on a bicycle rack, the steps comprising:

(a) providing a vehicle with a rearward projecting trailer hitch sleeve;

(b) providing a longitudinal base member and inserting a proximal end portion of the longitudinal base member into the trailer hitch sleeve;

(c) securing the longitudinal base member to the trailer hitch sleeve with a locking device passing through aligned transverse bores in the longitudinal base member and the trailer hitch sleeve;

(d) providing a pair of brackets pivoting rearward on each side wall at the distal end portion of the longitudinal base member;

(e) providing a handlebar support member integral with a rear portion of the pair of brackets;

(f) providing a padded upright member attached to the pair of brackets, the padded upright member provided with a transverse row of bores;

(g) mounting the bicycle handlebars on the handlebar support member and lifting the bicycle upwards and inserting a U-shaped bolt around the frame of the bicycle through a bore in the padded upright member;

(h) locking the U-shaped bolt in position; and (i) inserting a locking pin through transverse aligned bores in the pair of brackets and the longitudinal base member to lock the upright member in position to retain the bicycle in an upright configuration in a plane parallel to a longitudinal axis of the vehicle.

15. The method of mounting a bicycle on a bicycle rack according to claim 14 with the additional step of placing a cover over the bicycle.

16. The method of mounting a bicycle on a bicycle rack according to claim 14 wherein the pair of brackets are provided in a triangle shape.

* * * * *